United States Patent [19]
Powning

[11] 3,874,560
[45] Apr. 1, 1975

[54] PNEUMATIC CONVEYORS

[75] Inventor: Leslie George Powning, Stockport, England

[73] Assignee: Sturtevant Engineering Company Limited

[22] Filed: May 8, 1973

[21] Appl. No.: 358,416

Related U.S. Application Data

[63] Continuation of Ser. No. 144,859, May 19, 1971, abandoned.

[30] Foreign Application Priority Data
May 22, 1970 United Kingdom .............. 25011/70

[52] U.S. Cl. .............. 222/193, 137/604, 137/614.2
[51] Int. Cl. .............................................. B67d 5/54
[58] Field of Search .......... 137/614.2, 604, 614.19, 137/613, 525; 222/373, 193; 302/26, 41, 42, 48, 53, 54, 55; 251/339, 129; 141/67

[56] References Cited
UNITED STATES PATENTS

| | | | |
|---|---|---|---|
| 921,760 | 5/1909 | Waterman | 251/129 X |
| 1,261,922 | 4/1918 | Grasty et al. | 302/53 |
| 2,036,713 | 4/1936 | McBath, Jr. | 251/129 X |
| 2,216,890 | 10/1940 | Philipps | 222/373 UX |
| 2,678,240 | 5/1954 | Snow | 302/53 |
| 2,723,057 | 11/1955 | Golden | 302/55 UX |
| 2,819,679 | 1/1958 | Wilson | 302/53 UX |
| 3,095,018 | 6/1963 | Moreland | 222/373 X |
| 3,195,586 | 7/1965 | Vogt | 141/67 X |
| 3,344,807 | 10/1967 | Lehrer et al. | 137/614.19 X |
| 3,365,240 | 1/1968 | Gordon | 302/55 UX |

Primary Examiner—Manuel A. Antonakas
Assistant Examiner—Ira S. Lazarus
Attorney, Agent, or Firm—Cushman, Darby & Cushman

[57] ABSTRACT

A pneumatic conveyor valve which includes a valve body, an inlet thereto for material whose flow is to be controlled and an outlet therefrom, valves at the inlet and outlet and a connection to the valve body, downstream of the inlet valve for coupling the body to a fluid supply.

3 Claims, 2 Drawing Figures

PNEUMATIC CONVEYORS

This is a continuation of application Ser. No. 144,859 filed May 19, 1971 now abandoned.

This invention is concerned with pneumatic conveyors and particularly conveyors for material such as particulate synthetic plastics material for feeding to injection moulding machines.

Various pneumatic conveying systems have been proposed to handle powder and particulate materials. As examples may be mentioned high pressure conveyors in which material is fed through a rotary valve or the like into a high pressure line along which air will carry the material rapidly to a selected one of a plurality of outlets. Such systems require large volumes of free air to be pumped into the system, they are relatively massive and complex and expensive. Each outlet requires elaborate filtering arrangements to remove the conveyed material from the air stream and only one material can be handled at a time.

Another arrangement used in the plastics industry is a vacuum pump mounted above each of the hoppers to be supplied, and a pipe which can be coupled to a cask or drum brought to the hopper location so that the hopper can be recharged from the cask. This arrangement is satisfactory where there are few hoppers to feed but again filtering has to be carried out at the point of discharge into the hopper.

According to the present invention there is provided a valve for feeding particulate or powder material comprising a body having a cylindrical wall, an inlet defined by a plate engaging one end of said wall, an outlet defined by a plate engaging the other end of said wall, an inlet pipe extending from said inlet exteriorly of said body, an outlet pipe extending from said outlet exteriorly of said body, said valve further comprising a valve member coupled to a control rod operable by a solenoid, said valve member having a disc movable with said control rod to open and close said inlet, a one-way valve member at said outlet operable at least for opening by a differential between the pressure thereacross and the pressure within said body and means for coupling the body downstream of said inlet to a gas supply.

Such a valve may be fitted below a hopper to receive a material under gravity at the inlet and may be coupled to a line having either a single outlet or a number of outlets which can be selectively operated.

In order that the invention may be well understood there will now be described an embodiment thereof, given by way of example only, reference being had to the accompanying drawing in which.

Figure 1:
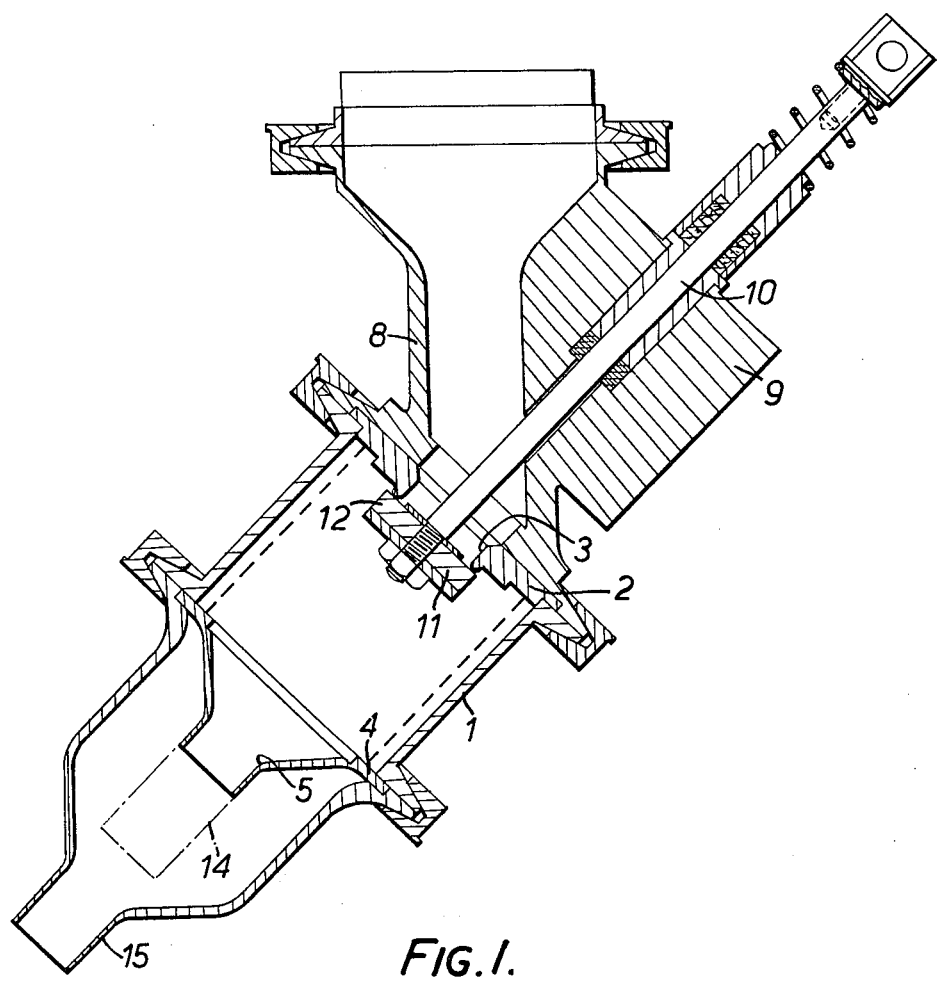
FIG. 1 is a cross section through a valve.

The valve comprises a body 1, an inlet plate 2, defining an inlet port 3, and an exhaust plate 4 defining an outlet port 5. A pair of fluid inlet pipes 7 (FIG. 2) communicate with the body 1 downstream of inlet port 3 and upstream of the outlet port 5.

An inlet pipe 8 which is inclined to the axis of the inlet port 3 supports a guide 9 carrying a piston rod 10 coupled to a valve member 11 which is here disc 12.

The outlet port opens into a naturally flat flexible tube 14 extending into an outlet pipe 15.

Plates 2 and 4 are clamped on to the ends of annular body 1 and the clamps secure the inlet and outlet pipes to the body.

The member 11 may be of neoprene rubber backed by a stainless steel plate and the body of machined cast aluminum. An annular porous partition, as of sintered bronze, may be provided coaxial with the body and extending between the plates 2 and 4 to prevent material entering the air supply system.

Figure 2:
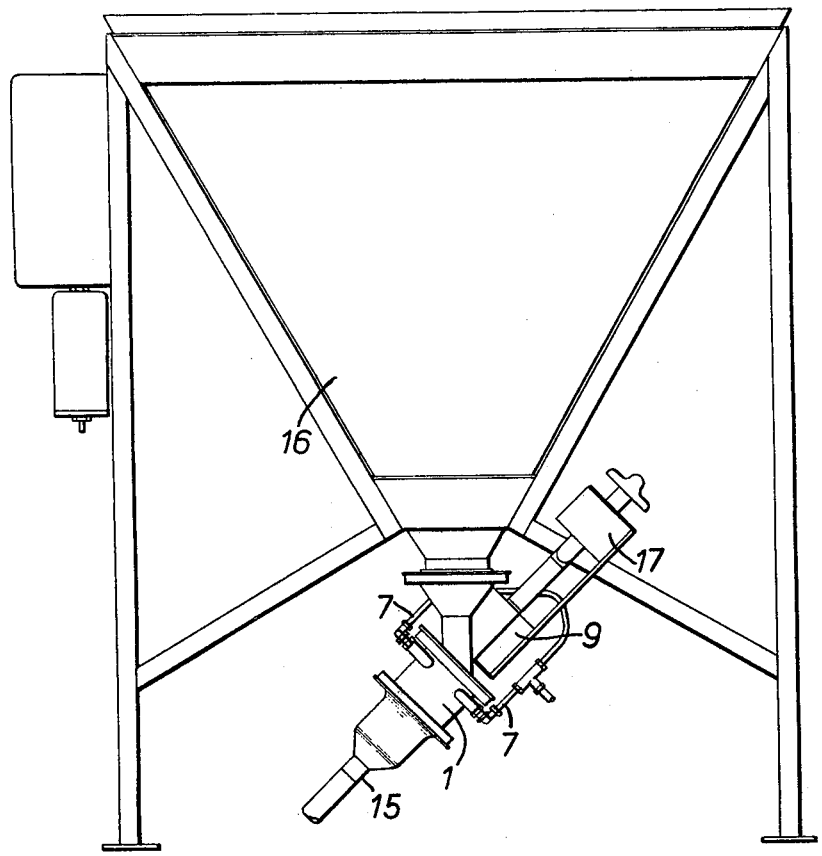
FIG. 2 is an elevation of a hopper with the valve fitted thereto.

The inlet pipe is positioned at the base of a hopper 16 in FIG. 2 or at the outlet of a screw conveyor as proposed in our co-pending application of even date concerning screw conveyors for feeding pigments and colour concentrates into a stream of particulate synthetic plastics for mixing therewith prior to injection moulding. Alternatively, the valve may be in the base of a funnel for positioning below a hopper outlet. If the inlet is at the base of a hopper, the material in the hopper may be fluidised to ensure flow into the inlet pipe 8.

In operation a control of known type, e.g. a solenoid, 17 operates to drive the element 11 downwards by means of the piston rod 10. Fluid flow to the body is off and the tube 14 is held closed by a pressure differential thereacross. Material flows through the port 3 until a suitable timing device returns member 11 to close port 3 and opens the fluid connection to the body. This fluid, at superatmospheric pressure, will drive the material through the tube 14, overcoming the pressure across tube 14, and the material will pass down the outlet pipe. The fluid supply is then cut off and the cycle is repeated. Thereby 'slugs' of material are fed down the outlet pipe in which a superatmospheric pressure will prevail, to a discharge point. Discharge distances of up to one hundred feet have been achieved and lifts of 20 feet.

The valve is particularly suited for feeding synthetic plastics material to the feed hopper of a moulding machine from a colour mixing plant or from a central store. It is found that 300 lbs/hr of material can be conveyed using 3–4 cu. ft. of free air per minute and the system has worked entirely satisfactorily while conveying 1,000 lbs/hr. A convenient supply system will comprise a supply bin, preferably having a low level sensor operable to switch off the associated machine if the bin becomes empty. A valve as described controls supply from the bin to a blending machine whose outlet has another like valve. Preferably the blender will have upper and lower level sensors to stop and start supply from the bin. The blender valve outlet will be coupled to the moulding machine supply hopper which again will have upper and lower level sensors to control feed from the blender hopper.

I claim:

1. Apparatus for feeding particulate or powder material comprising:

a hopper for the material, said hopper having an outlet, a valve comprising a body, said body having an annular wall, a plate engaging one end of said wall and defining an inlet to said body, and a plate engaging the other end of said wall and defining an outlet, an inlet pipe extending from said inlet of said body and connected to said outlet of said hopper, said inlet pipe and said inlet of said body having axes that are inclined to one another, an outlet pipe extending from said outlet exteriorly of said body, a valve member including a disc movable to open and close said inlet, means for moving said disc comprising a solenoid and a control rod connected to said disc and to said solenoid and extending from said disc through said inlet and transversely through said inlet pipe towards said solenoid, said solenoid being mounted exteriorly of said body, a one-way flat valve member at said outlet operable by a differential pressure thereacross between the pressure in said body and the pressure in said outlet pipe; said disc and said flat valve member being disposed coaxially of said body with said control rod extending axially of said inlet towards said solenoid so that the flow path in said body between said disc and flat valve is unobstructed, and, means for coupling said body downstream of said inlet to a gas supply.

2. A valve as claimed in claim 1 wherein said one-way valve member comprising a flexible tube which is flat in the absence of a pressure differential thereacross.

3. A valve as claimed in claim 1 including a porous partition provided within said annular wall for isolating said coupling means from material in said body.

* * * * *